United States Patent [19]

Shoda

[11] Patent Number: 5,117,716
[45] Date of Patent: * Jun. 2, 1992

[54] DUAL TEMPLATE ASSEMBLY FOR A TRACER LATHE

[76] Inventor: Robert L. Shoda, R.R. #7, Hartman Rd., Columbia City, Ind. 46725

[ * ] Notice: The portion of the term of this patent subsequent to May 2, 2008 has been disclaimed.

[21] Appl. No.: 434,610

[22] Filed: Nov. 8, 1989

Related U.S. Application Data

[63] Continuation of Ser. No. 291,638, Dec. 29, 1988, abandoned.

[51] Int. Cl.⁵ ............................... B23B 7/00
[52] U.S. Cl. ................................ 82/11.1; 82/11.5
[58] Field of Search ............ 82/14 A, 14 B, 14 C, 82/14 D, 14 E, 14 R, 11.1, 11.2, 11.3, 11.4, 11.5, 11; 409/110, 118

[56] References Cited

U.S. PATENT DOCUMENTS

| | | | |
|---|---|---|---|
| 2,314,250 | 3/1943 | Smith | 82/14 R |
| 2,433,048 | 12/1947 | Himoff . | |
| 2,691,913 | 10/1954 | Waterson | 82/14 R |
| 2,920,519 | 1/1960 | Huggler | 82/14 R |
| 3,046,822 | 7/1962 | Von Zelewsky . | |
| 3,111,051 | 11/1963 | Hoffmann . | |
| 3,156,144 | 11/1964 | Weaver | 82/14 R |
| 3,185,003 | 5/1965 | Jeanneret . | |
| 3,200,682 | 8/1965 | Le Brusque . | |
| 3,237,492 | 3/1966 | Massey . | |
| 3,252,363 | 5/1966 | Matthias . | |
| 3,309,950 | 3/1967 | Weaver . | |
| 3,427,905 | 2/1969 | Imgrund . | |
| 3,575,071 | 3/1971 | Miller et al. . | |
| 3,630,110 | 12/1971 | Jeanneret . | |
| 3,972,251 | 8/1976 | Gorman et al. . | |
| 4,119,048 | 10/1978 | Scholl et al. | 82/14 R |

*Primary Examiner*—Frederick R. Schmidt
*Assistant Examiner*—Blynn Shideler

[57] ABSTRACT

A dual template assembly for permitting rough and finish cuts to be made on successive passes of a tracer lathe includes separate rough and finish templates. A pneumatic cylinder selectively causes sliding movement of the rough template relative to the finish template. The rough template is initially moved to an extended position, wherein an edge thereof is exposed over an edge of the finish template. A lathe tracing stylus is moved across the rough template edge, causing the lathe to remove material from a workpiece in accordance with the rough shaped defined thereby. A sensor generates a signal when the tracing stylus completes its movement across the rough template. In response thereto, the control circuit causes the rough template to be moved to a retracted position, wherein the finish template edge is exposed over the rough template edge. The tracing stylus is then moved across the finish template edge, thereby causing the lathe to remove material from the workpiece in accordance with the final shape defined thereby. The control circuit then returns the rough template to the extended position so that the entire operation may be repeated.

31 Claims, 2 Drawing Sheets

DUAL TEMPLATE ASSEMBLY FOR A TRACER LATHE

This is a continuation of 07/291,638 filed Dec. 29, 1988, abandoned.

BACKGROUND OF THE INVENTION

This invention relates in general to tracer or duplicating lathes and in particular to a dual template assembly for permitting rough and finish cuts to be made in a workpiece by successive passes of a cutting tool of a lathe.

The lathe is one of the most basic of all of the metal and wood working tools. Lathes are designed to support a workpiece between centers or in a chuck and to rotate the workpiece against a non-rotating cutting tool. As a result, material is selectively removed from the workpiece in order to form the outer surface thereof into a desired shape or profile. Cylindrical and conical parts, such as pins, bolts, shafts, discs, and the like, are often formed on lathes.

In particular, lathes are well suited for repeatedly duplicating the shape of a workpiece. In order to accomplish this, the lathe is usually equipped with a tracing mechanism. The tracing mechanism includes a flat planar template having an edge surface which is formed in the same shape as the desired profile for the workpiece. A tracing stylus is positioned against the edge surface of the template and moved therealong such that the tracing stylus follows the edge surface. A cutting tool is connected to the tracing stylus for movement therewith. The tracing stylus and the cutting tool are usually moved co-axially with the axis of rotation of the workpiece. Thus, the cutting tool cuts the pattern of the edge surface of the template into the workpiece as it is moved axially therealong. So long as the template is securely attached to the lathe and the tracing stylus is securely connected to the cutting tool, the tracer lathe can quickly reproduce the shape of a workpiece.

Although the tracer lathe is useful for repeatedly duplicating the general shape of a workpiece, it has not been entirely successful in providing a high degree of precision in such reproduced workpieces. This is because the workpiece, prior to being machined on the lathe, is usually initially formed having a shape which only very roughly approximates the desired final shape. For example, the workpiece may be initially formed having a diameter which is approximately two hundred thousandths of an inch larger than the desired finished diameter. Many tracer lathes permit only a single pass of the tracing stylus along the single template. Accordingly, the cutting tool is required to remove a relatively large amount of material from the workpiece (one hundred thousandths of an inch along the radius thereof) on the single pass of the cutting tool across the workpiece. Since the cutting tool is required to remove such a large amount of material, the accuracy of such removal is reduced, even when the speed at which the cutting tool is moved along the workpiece is reduced. In other words, the tracer lathe cannot form the workpiece to highly accurate finish tolerances, on the order of two thousandths of an inch, because such finish tolerances are achievable only when a smaller amount of material is removed from the workpiece.

In order to increase the accuracy of the material removing process, some tracer lathes are provided with a tracing stylus which is selectively movable relative to the cutting tool. The tracing stylus is initially moved to a first tracing position relative to the cutting tool for engagement with the template during a first pass of the cutting tool along the workpiece. This first pass causes a rough cut to be made in the workpiece which closely approximates the final desired shape. After the rough cut pass is completed, the tracing stylus is moved to a second tracing position relative to the cutting tool. Then, the tracing stylus is again moved along the template such that the cutting tool removes additional metal from the workpiece. This second pass of the cutting tool causes a finish cut to be made in the workpiece, thereby achieving the final desired shape. Although this type of tracer lathe provides improved accuracy because less material is removed from the workpiece on the final pass of the cutting tool, the mechanism which supports and moves the tracing stylus relative to the cutting tool undesirably introduces additional margins of error which limit the accuracy thereof. Also, such mechanisms are usually complicated and expensive.

Some lathes are operated by a computer in accordance with a predetermined program which defines the movements of the cutting tool relative to the workpiece. Computer numerical control (commonly referred to as CNC) lathes of this type have been provided which make successive rough and finish cutting passes along a workpiece. Since the movement of the cutting tool is controlled by a computer, however, CNC lathes do not use a template or a tracing stylus. Although CNC lathes provide a high degree of accuracy, they are very expensive in comparison with conventional tracer lathes.

SUMMARY OF THE INVENTION

This invention relates to a dual template assembly for permitting rough and finish cuts to be made on successive passes of an otherwise conventional tracer lathe. The template assembly includes separate rough and finish templates which are mounted on a stationary support plate secured to the lathe. The finish template is attached to the support plate, while the rough template is guided between the finish template and the support plate for sliding movement relative thereto. A pneumatic cylinder is attached to the support plate. The cylinder includes a movable piston which is connected to the rough template for selectively causing sliding movement thereof. A control circuit controls the operation of the pneumatic cylinder and, therefore, the movement of the rough template. The rough template is initially moved to an extended position by the pneumatic cylinder, wherein an upper edge surface thereof is exposed over an upper edge surface of the finish template. A tracing stylus of the lathe is then moved across the upper edge surface of the rough template, thereby causing the lathe to remove material from a workpiece according to the rough shape defined by such upper edge surface. A position sensor senses when the tracing stylus has completed its movement across the rough template and generates a signal to the control logic circuit. The control logic circuit causes the piston to be retracted within the pneumatic cylinder, thereby moving the rough template to a retracted position. In the retracted position, the upper edge surface of the finish template is exposed over the upper edge surface of the rough template. The tracing stylus is then moved across the upper edge surface of the finish template, thereby causing the lathe to remove material from the workpiece according to the final shape defined by the upper edge surface of the finish template. Following the finish cutting operation, the control logic circuit returns the rough template to the extended position so that the entire operation may be repeated on a different workpiece.

It is an object of this invention to provide a dual template assembly for permitting rough and finish cuts to be made on successive passes of a conventional tracer lathe.

It is another object of this invention to provide such a dual template assembly which permits material to be removed from a workpiece with a high degree of accuracy.

It is a further object of this invention to provide such a dual template assembly which is simple and inexpensive in construction and operation.

Other objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
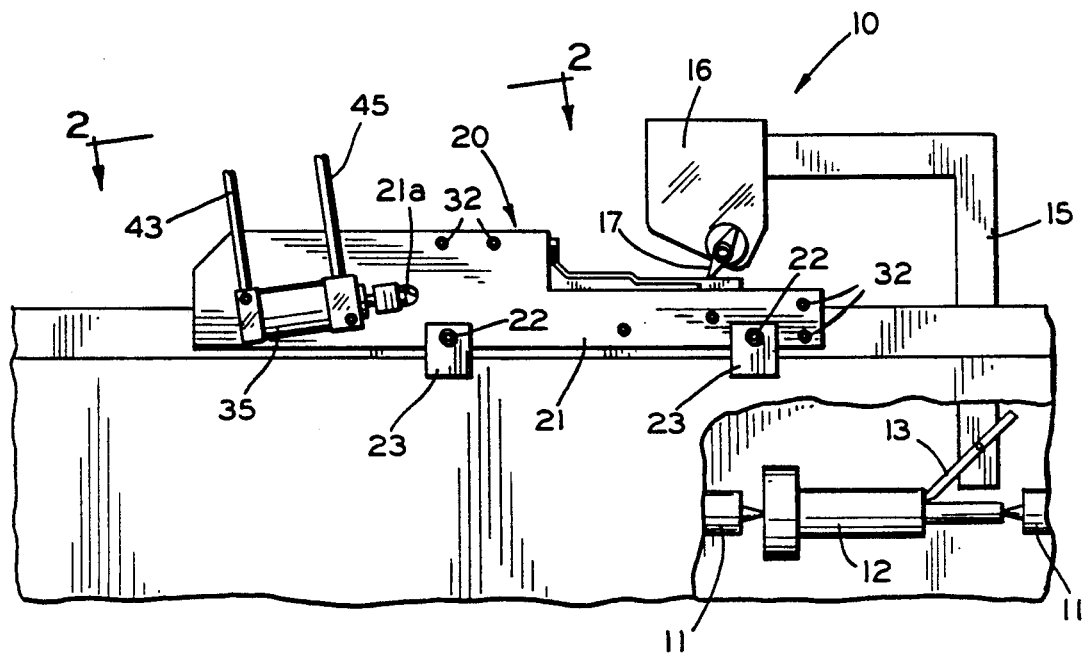
FIG. 1 is a side elevational view schematically illustrating a portion of a tracer lathe including a dual template assembly in accordance with this invention.

Referring now to the drawings, there is schematically illustrated in FIG. 1 a portion of a tracer lathe, indicated generally at 10. The lathe 10 is conventional in the art, and the general structure and operation thereof are well known. The lathe 10 includes a pair of centers 11 for supporting a workpiece 12. The centers 11 are aligned so as to be rotatable about an axis, together with the workpiece 12. One of the centers 11 is driven by any conventional means (not shown) so as to rotate the workpiece 12 about the axis.

A cutting tool 13 is carried at one end of an arm 15 of the lathe 10. As is well known, the cutting tool 13 is selectively moved into engagement with the rotating workpiece 12 so as to remove material therefrom. The movable arm 15 is also connected to a tracing head 16 which carries a tracing stylus 17. Thus, the tracing stylus 17 is fixed in position relative to the cutting tool 13. The tracing stylus 17 is adapted to selectively engage a dual template assembly, indicated generally at 20. As a result of such engagement, the tracing stylus 17 causes the tracing head 16, the movable arm 15, and the cutting tool 13 to move in such a manner as to remove material from the workpiece 12 in accordance with a predetermined pattern to form the workpiece 12 into a desired shape.

The lathe 10 includes conventional means (not shown) for moving the arm 15, as well as the cutting tool 13 and the tracing head 16 carried thereon, both axially and radially relative to the workpiece 12. In order for the cutting tool 15 to perform a cutting operation on the workpiece 12, the arm 15 is initially moved such that the tracing stylus 17 engages one end (the right end when viewing FIG. 1) of an upper edge surface of the template assembly 20 In doing this, the cutting tool 13 is moved to an initial cutting position relative to the workpiece 12. Then, the arm 15 is moved in a direction which is co-axial with the axis of rotation of the workpiece 12, from right to left in FIG. 1. During such axial movement, the tracing stylus 17 moves radially inwardly and outwardly relative to such axis as it follows the upper edge surface of the template assembly 20, and the cutting tool 13 follows such movement. Consequently, the cutting tool 13 removes material from the workpiece 12 in such a manner that the shape of the outer surface thereof duplicates the shape of the upper edge surface of the template assembly 20.

Figure 2:
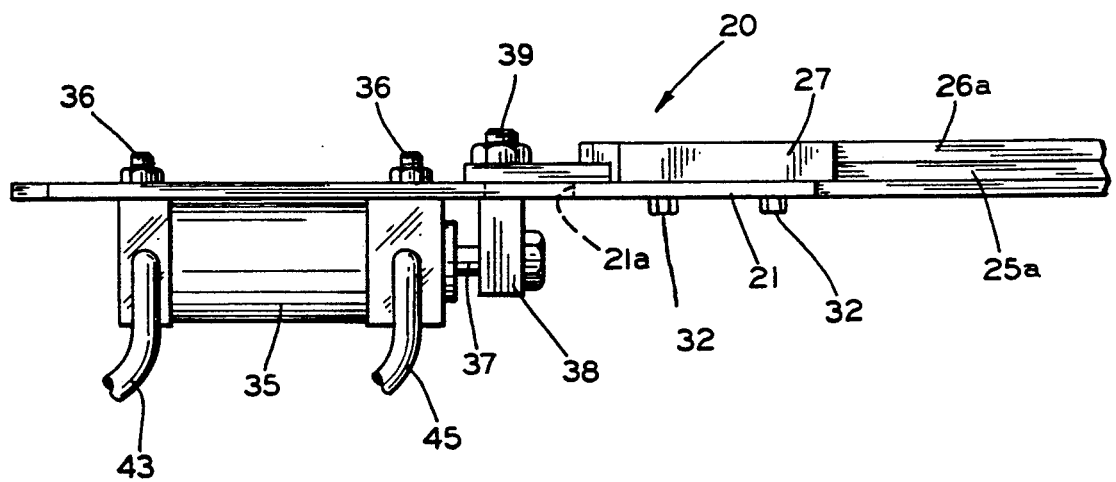
FIG. 2 is a top view of the dual template assembly taken along line 2—2 of FIG. 1.

Referring now to FIG. 2, the structure of the dual template assembly 20 is illustrated in detail. As shown therein, the assembly 20 includes a generally flat planar support plate 21. The support plate 21 is attached to a non-moving portion of the lathe 10 by any conventional means, such as by a plurality of threaded fasteners 22 and clamping blocks 23 illustrated in FIG. 1. The support plate 21 is attached in such a manner as to be immovable relative to the lathe 10. A first, template 25 is disposed adjacent to the support plate 21, and a second template 26 is disposed adjacent to the first template 25. As will be explained in greater detail below, the first template 25 is provided for causing the lathe 10 to perform a rough cutting operation on the workpiece 12, while the second template 26 is provided for causing the lathe 10 to perform a finish cutting operation on the workpiece 12.

Figure 3:
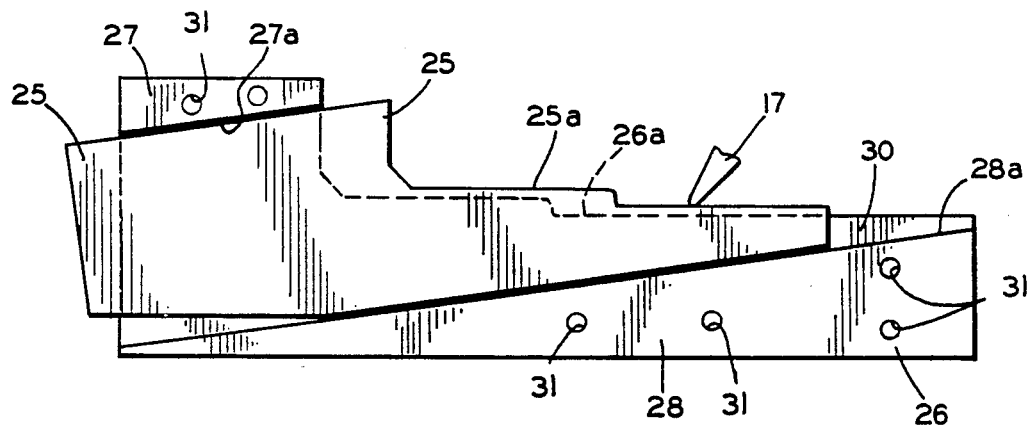
FIG. 3 is a side elevational view of the rough and finish templates of the dual template assembly, the rough template being shown in an extended position.
Figure 4:
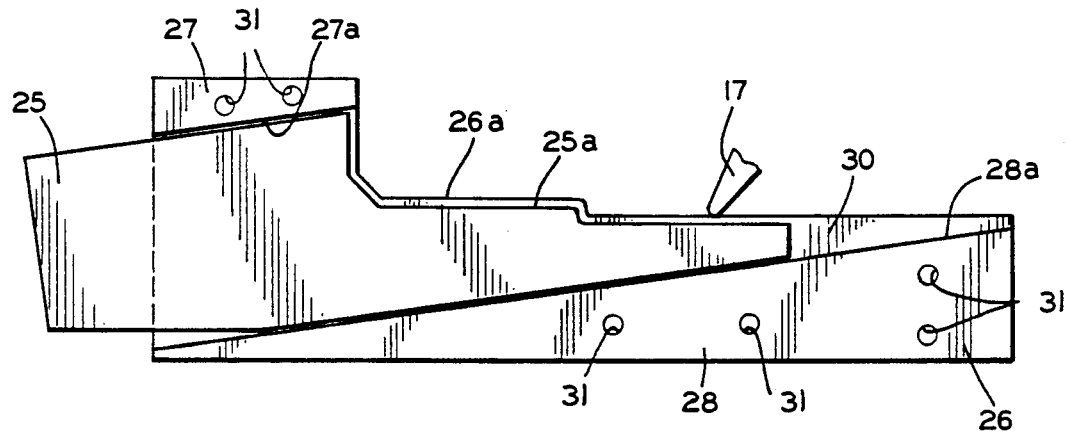
FIG. 4 is a side elevational view similar to FIG. 3 showing the rough template being shown in a retracted position.
Figures 5, 6:
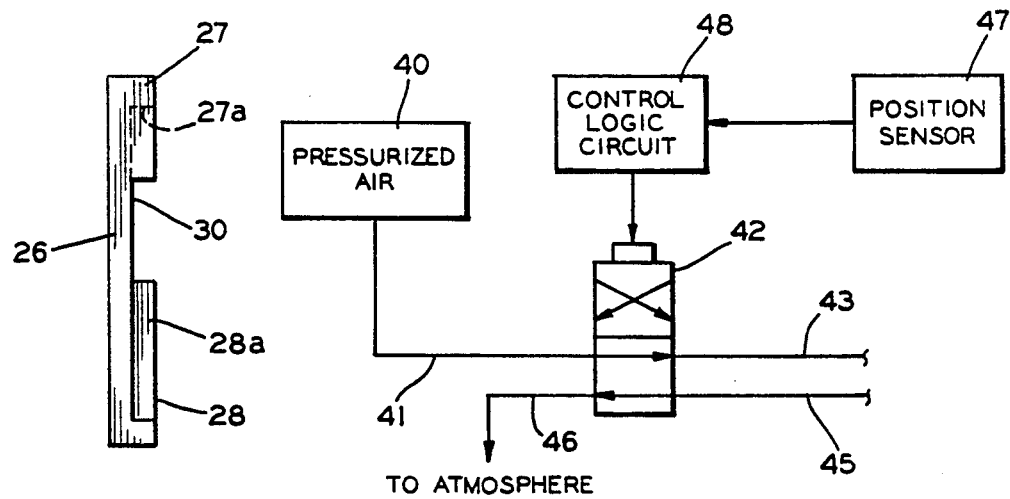
FIG. 5 is an end elevational view of the finish template illustrated in FIGS. 3 and 4.
FIG. 6 is a schematic block diagram of a pneumatic control circuit used to move the rough template between the extended and retracted positions shown in FIGS. 3 and 4.

As best shown in FIGS. 3, 4, and 5, the finish template 26 is generally flat and planar in shape, but has an upper thickened portion 27 and a lower thickened portion 28 formed integrally therewith. Between the two thickened portions 27 and 28, a recessed area 30 is defined. The upper edge of the recessed area 30 is bounded by an upper inclined surface 27a, which forms the lower edge of the upper thickened portion 27. Similarly, the lower edge of the recessed area 30 is bounded by a lower inclined surface 28a, which forms the upper edge of the lower thickened portion 28. Preferably, the inclined surfaces 27a and 28a are parallel. The angle of inclination of the surfaces 27a and 28a may be varied, as will be explained below. However, it has been found that such angle of inclination is preferably within the range of from six degrees to ten degrees, and more specifically at eight degrees, above the horizontal.

The upper and lower thickened portions 27 and 28 are each provided with a plurality of threaded apertures 31 (see FIGS. 3 and 4) to permit respective threaded fasteners 32 (see FIGS. 1 and 2) to rigidly attach the finish template 26 to the support plate 21. When so attached, the recessed area 30 defines a passageway between the finish template 26 and the support plate 21. The rough template 25 is flat and planar in shape, having a thickness which is slightly smaller than the thickness of this passageway. Thus, the rough template 25 is retained within the passageway between the support plate 21 and the finish template 26 and is slidably movable therein. The upper and lower inclined surfaces 27a and 28a of the finish template 26 guide the rough template 25 along the eight degree incline when it is moved relative thereto.

Referring back to FIG. 2, means are provided for selectively moving the rough template 25 through the passageway relative to the support plate 21 and the finish template 26. Such means includes a pneumatic cylinder 35, which is attached to the support plate 21 by a pair of threaded fasteners 36. The pneumatic cylinder 35 is preferably mounted such that it is inclined at the same angle as the inclined surfaces 27a and 28a. The pneumatic cylinder 35 includes a movable internal piston 37, the outer end of which extends outwardly from the cylinder 35. A transverse cross member 38 is connected to the outer end of the piston 37. The cross member 38 extends through a slot 21a formed though the support plate 21 and is attached to the rough template 25, by a threaded fastener 39. Preferably, the slot 21a is also inclined at the same angle as the inclined surfaces 27a and 28a and the pneumatic cylinder 35. Thus, the piston 37, the cross member 38, and the rough template 25 are all movable together as a single unit.

As will be explained in greater detail below, the pneumatic cylinder 35 is used to selectively move the rough template 25 between an extended position, as shown in FIG. 3, and a retracted position, as shown in FIG. 4. When the rough template 25 is in the extended position, an upper edge surface 25a of the rough template 25 is disposed above an upper edge surface 26a of the finish template 26. Thus, the rough upper edge surface 25a is engaged by the tracing stylus 17 as it is moved along the rough template 25 during a cutting operation, as described above. Consequently, the tracing head 16, the movable arm 15, and the cutting tool 13 are moved in such a manner as to remove material from the workpiece 12 in accordance with the shape of the upper edge surface 25a of the rough template 25. When the rough template 25 is moved to the retracted position, however, the upper edge surface 25a thereof is disposed below the upper edge 26a of the finish template 26. Therefore, when the lathe 10 begins a cutting operation, the tracing stylus 17 engages the upper edge surface 26a of the finish template 26. As a result, the tracing head 16, the movable arm 15, and the cutting tool 13 are moved in such a manner as to remove material from the workpiece 12 in accordance with the shape of the upper edge surface 26a of the finish template 25.

FIG. 6 schematically illustrates a circuit for controlling the operation of the pneumatic cylinder 35 and, therefore, the position of the rough template 25. The control circuit includes a source of pressurized air 40. The source of pressurized air 40 is connected by a supply line 41 to a two position solenoid valve 42. When the valve 42 is in the position illustrated in FIG. 6, the supply line 41 communicates through the valve 42 with a first cylinder line 43. The first cylinder line 43 communicates with a first chamber (not shown) defined within the pneumatic cylinder 35 on one side of the piston 37. A second cylinder line 45 communicates with a second chamber (not shown) defined within the pneumatic cylinder 35 on the other side of the piston 37. When the valve 42 is in the position illustrated in FIG. 6, the second cylinder line 45 communicates through the valve 42 with a vent line 46, which is vented to the atmosphere.

A position sensor 47 is provided to sense the movement of the tracing head 16 across the template assembly 20 during a cutting operation, as described above. When the tracing head 16 has completed its movement from right to left across the template assembly 20, the position sensor 47 generates an electrical signal to a control logic circuit 48. Such electrical signal is used by the control logic circuit 48 to control the operation of the valve 42. Specifically, the control logic circuit 48 is responsive to the generation of the electrical signal for actuating the solenoid valve 42 to move from whatever position it is in when the signal is received to the opposite position. Thus, if the valve 42 is in the position illustrated in FIG. 6 when the electrical signal generated by the position sensor 47 is received by the control logic circuit 48, the control logic circuit 48 actuates the valve 42 to move to its opposite position, wherein the supply line 41 communicates with the second cylinder line 45, and the first cylinder 43 line communicates with the vent line 46.

The position of the piston 37 within the pneumatic cylinder 35, and thus the position of the rough template 25, is controlled by the operation of the valve 42. When the valve 42 is in the position illustrated in FIG. 6, pressurized air is supplied through the first cylinder line 43 to the first chamber defined within the pneumatic cylinder 35, while the second chamber defined therein is vented through the second cylinder line 45 to the atmosphere, as described above. The resultant pressure differential across the piston 37 causes the piston 37 to be extended from the cylinder 35, thereby moving the rough template 25 to the extended position illustrated in FIG. 3, as described above. When the rough template 25 is in this extended position, the tracing stylus 17 will engage the upper edge surface 25a of the rough template 25 during a first cutting operation as described above.

When the tracing stylus 17 completes its first pass from right to left across the upper edge surface 25a of the rough template 25, the position sensor 47 generates the electrical signal to the control logic circuit 48, thereby causing pressurized air to be supplied to the second chamber defined within the pneumatic cylinder 35 and the first chamber to be vented to the atmosphere. The resultant pressure differential causes the piston 37 to be retracted within the cylinder 35, thereby moving the rough template 25 to the retracted position illustrated in FIG. 4. When the rough template 25 is in this retracted position, the tracing stylus 17 will engage the upper edge surface 26a of the finish template 26 during a second cutting operation as described above.

When the tracing stylus 17 completes its second pass from right to left across the upper edge surface 26a of the finish template 26, the position sensor 47 again generates the electrical signal to the control logic circuit 48. As a result, the valve 42 is returned to the position illustrated in FIG. 6, and the rough template 25 is again extended for engagement by the tracing stylus 17. The control logic circuit 48 can be configured or programmed in a known manner such that the movable arm 15 of the lathe 10 automatically returns to the initial position mentioned above and immediately begins the second cutting operation immediately after completing the first cutting operation. However, when the second cutting operation has been completed, the control logic circuit 48 will return the movable arm 15 to a stationary standby position to allow an operator of the lathe 10 to replace the machined workpiece 12 with an unmachined workpiece.

The template assembly 20 described above permits the lathe 10 to perform an initial rough cutting operation on the workpiece 12 by following the shape of the upper edge surface 25a of the rough template 25 on a first pass of the movable arm 15. Since the rough cutting operation is designed to only approximate the desired final shape of the workpiece 12, any error introduced into the tracing operation by the extension of the rough template 25 is of no consequence. Once the rough cutting operation is completed, the subsequent finish cutting operation is performed by following the shape of the upper edge surface 26a of the finish template 26. Since the bulk of the excess material on the workpiece 12 has already been removed during the initial rough cutting operation, the finish cutting operation is capable of forming the workpiece 12 within very narrow tolerances. Additionally, since the finish template 26 is rigidly attached to the lathe 10, there is no error introduced into the tracing operation as a result of relative movement between the finish template 26 and the lathe 10 itself.

The inclined surfaces 27a and 28a are provided such that when the rough template 25 is moved into the extended position, all portions of the upper surface 25a thereof are disposed above all portions of the upper surface 26a of the finish template 26. The angle of inclination causes the rough template 25 to be moved not only laterally relative to the finish template 26, but also upwardly as well. Depending upon the specific configurations for the rough and finish templates 25 and 26, respectively, the angle of inclination may be varied to accomplish this relative positioning with a minimum amount of movement of the rough template 25 between the extended and retracted positions.

In accordance with the provisions of the patent statutes, the principle and mode of operation of the invention have been described and illustrated in its preferred embodiment. However, it must be understood that the invention may be practiced otherwise than as specifically explained and illustrated without departing from its spirit or scope.

What is claimed is:

1. A dual template assembly adapted to cooperate with a tracing head of a tracer lathe so as to guide the movement of a cutting tool comprising:
   first template means including a first plate having an edge adapted to be selectively engaged by the tracing head of the tracer lathe;
   second template means including a second plate having an edge to be selectively engaged by the tracing head of the tracer lathe;
   means for selectively moving said second template means relative to said first template means between extended and retracted positions such that said first and second plate edges are alternately exposed for engagement by the tracing head of the tracer lathe; and
   a guide surface formed on one of said first and second plates for engaging the other of said first and second plates and thereby guiding said relative movement of said second template means.

2. The invention defined in claim 1 wherein said first template means is a finish cut template and said second template means is a rough cut template.

3. The invention defined in claim 1 wherein said guide surface is defined by a recessed area formed on said first template means, said guide surface engaging said second template means for guiding movement thereof relative to said first template means.

4. The invention defined in claim 3 wherein said guide surface is defined by a thickened upper portion of said first template means.

5. The invention defined in claim 3 wherein said guide surface is defined by a thickened lower portion of said first template means.

6. The invention defined in claim 3 wherein said guide surface is inclined above the horizontal.

7. The invention defined in claim 6 wherein said guide surface is inclined at an angle within the range of from six to ten degrees above the horizontal.

8. The invention defined in claim 1 wherein upper and lower guide surfaces are defined by a recessed area formed on said first template means, said guide surfaces engaging said second template means for guiding movement thereof relative to said first template means.

9. The invention defined in claim 8 wherein said upper guide surface is defined by a thickened upper portion of said first template means and said lower guide surface is defined by a thickened lower portion of said first template means.

10. The invention defined in claim 9 wherein said guide surfaces are parallel and inclined above the horizontal.

11. The invention defined in claim 10 wherein said guide surfaces are inclined at an angle within the range of from six to ten degrees above the horizontal.

12. The invention defined in claim 1 wherein said means for selectively moving includes a cylinder having a movable piston connected to said second template means.

13. The invention defined in claim 12 wherein said means for selectively moving further includes a source of pressurized air connected to said cylinder through a valve means, said piston being retracted within said cylinder when said valve means is in a first position so as to move said second template means to its retracted position, and said piston being extended from said cylinder when said valve means is in a second position so as to move said second template means to its extended position.

14. The invention defined in claim 13 wherein said means for selectively moving further includes control logic circuit means for selectivley moving said valve means between said first and second positions.

15. A tracer lathe for selectively removing material from a workpiece comprising:
   support means for rotating the workpiece about an axis;
   cutting tool means movably supported relative to said support means for selectively engaging the workpiece to remove material therefrom;
   tracer means connected to said cutting tool for movement therewith; and
   template assembly means adapted to be engaged by said tracer means for controlling movement of said cutting tool means, said template assembly means including a first template plate having an edge adapted to be selectively engaged by the tracer means, a second template plate having an edge adapted to be selectively engaged by the tracer means, means for selectively moving said second template plate relative to said first template plate between extended and retracted positions such that said first and second template plate edges are alteratively exposed for engagement by said tracer means, and a guide surface formed on one of said first and second template plates for engaging the other of said first and second template plates and thereby guiding said relative movement of said second template plate.

16. The invention defined in claim 15 wherein said first template plate is a finish cut template and said second template plate is a rough cut template.

17. The invention defined in claim 15 wherein said second template plate is disposed adjacent to said first template plate and movable relative thereto between said extended and retracted positions.

18. The invention defined in claim 15. wherein said guide surface is defined by a recessed area formed on said first template plate, said guide surface engaging said second template plate for guiding movement thereof relative to said first template plate.

19. The invention derived in claim 18 wherein said guide surface is defined by a thickened upper portion of said first template plate.

20. The invention defined in claim 18 wherein said guide surface is defined by a thickened lower portion of said first template plate.

21. The invention defined in claim 18 wherein said guide surface is inclined above the horizontal.

22. The invention defined in claim 21 wherein said guide surface is inclined at an angle within the range of from six to ten degrees above the horizontal.

23. The invention defined in claim 15 wherein upper and lower guide surfaces are defined by a recessed area formed on said first template plate, said guide surfaces engaging said second template plate for guiding movement thereof relative to said first template plate.

24. The invention defined in claim 23 wherein said upper guide surface is defined by a thickened upper portion of said first template plate and said lower guide surface is defined by a thickened lower portion of said first template plate.

25. The invention defined in claim 14 wherein said guide surfaces are parallel and inclined above the horizontal.

26. The invention defined in claim 25 wherein said guide surfaces are inclined at angle within the range of from six to ten degrees above the horizontal.

27. The invention defined in claim 15 wherein said means for selectively moving includes a cylinder having a movable piston connected to said second template plate.

28. The invention defined in claim 27, wherein said means for selectively moving further includes a source of pressurized air connected to said cylinder through a valve means, said piston being retracted within said cylinder when said valve means is in a first position so as to move said second template plate to its retracted position, and said piston being extended from said cylinder when said valve means is in a second position so as to move said second template plate to its extended position.

29. The invention defined in claim 28 wherein said means for selectively moving further includes control logic circuit means for selectively moving said valve means between said first and second positions.

30. The invention defined in claim 29 further including a position sensor which is responsive to movement of said cutting means for generating a signal, said control logic circuit means being responsive to said signal for moving said valve means to the opposite position after each pass of said cutting means across the workpiece.

31. A dual template assembly adapted to cooperate with a tracing head of a tracer lathe so as to guide the movement of a cutting tool comprising:
first template means including a first plate having an edge adapted to be selectively engaged by the tracing head of the tracer lathe, said first template means being secured to the tracer lathe so as to be immovable relative thereto;
second template means including a second plate having an edge adapted to be selectively engaged by the tracing head of the tracer lathe, said second template means being carried on the tracer lathe for movement relative to said first template means;
means for selectively moving said second template means relative to said first template means between extended and retracted positions such that said first and second plate edges are alternately exposed for engagement by the tracing head of the tracer lathe; and
means formed on the tracer lathe for guiding said relative movement of said second template means.

* * * * *

UNITED STATES PATENT AND TRADEMARK OFFICE
CERTIFICATE OF CORRECTION

PATENT NO. : 5,117,716

DATED : June 2, 1992

INVENTOR(S) : Robert L. Shoda

It is certified that error appears in the above-identified patent and that said Letters Patent is hereby corrected as shown below:

Column 7:

Claim 1, line 49, after "edge", insert -- adapted --.

Column 9:

Claim 15, lines 65 and 66, after "are", change "alteratively" to -- alternately --.

Claim 19, line 17, after "invention", change "derived" to -- defined --.

Claim 25, line 42, after "claim", change "14" to -- 24 --.

Claim 26, line 38, after "at" insert -- an --.

Signed and Sealed this

Sixth Day of July, 1993

Attest:

MICHAEL K. KIRK

*Attesting Officer*   Acting Commissioner of Patents and Trademarks